(12) United States Patent
Londono et al.

(10) Patent No.: US 11,799,290 B2
(45) Date of Patent: Oct. 24, 2023

(54) METHOD FOR CONTROLLING A POWER PLANT

(71) Applicant: VESTAS WIND SYSTEMS A/S, Aarhus (DK)

(72) Inventors: Federico Rueda Londono, Aarhus (DK); Germán Claudio Tarnowski, Aarhus (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 93 days.

(21) Appl. No.: 17/434,952

(22) PCT Filed: Feb. 6, 2020

(86) PCT No.: PCT/DK2020/050030
§ 371 (c)(1),
(2) Date: Aug. 30, 2021

(87) PCT Pub. No.: WO2020/173529
PCT Pub. Date: Sep. 3, 2020

(65) Prior Publication Data
US 2022/0149627 A1    May 12, 2022

(30) Foreign Application Priority Data
Feb. 28, 2019    (DK) .......................... PA 2019 70138

(51) Int. Cl.
*H02J 3/24* (2006.01)
*H02J 3/38* (2006.01)
*H02J 3/48* (2006.01)

(52) U.S. Cl.
CPC .............. *H02J 3/241* (2020.01); *H02J 3/381* (2013.01); *H02J 3/48* (2013.01); *H02J 2300/24* (2020.01); *H02J 2300/28* (2020.01)

(58) Field of Classification Search
CPC .... H02J 3/241; H02J 3/381; H02J 3/48; H02J 2300/24; H02J 2300/28
(Continued)

(56) References Cited

U.S. PATENT DOCUMENTS 8,618,694 B2 * 12/2013 Santos .................... F03D 7/048
307/105
2008/0093856 A1    4/2008 Stiesdal
(Continued)

FOREIGN PATENT DOCUMENTS

WO    2020173529 A1    9/2020

OTHER PUBLICATIONS

Danish Patent and Trademark Office, 1st Technical Examination Report for Application PA 2019 70138 DK, dated Sep. 5, 2019.
(Continued)

*Primary Examiner* — Hal Kaplan
(74) *Attorney, Agent, or Firm* — Patterson + Sheridan, LLP

(57) ABSTRACT

The present invention relates to a method for operating a power plant comprising a plurality of power producing units, the power plant being operatively connected to an associated power grid having a nominal grid frequency, the method comprising the steps of determining grid frequency variations of the associated power grid, and providing, in response to the determined grid frequency variations, an active power set-point to each of the plurality of power producing units, said active power set-point causing each of the plurality of power producing units to produce active power in response to said active power set-point, said produced active power comprising, in a frequency domain, one or more active power frequency components being
(Continued)

different from one or more undesired frequency modes. The present invention also relates to a power plant controller for performing the method.

16 Claims, 5 Drawing Sheets

(58) Field of Classification Search
USPC .......................................................... 307/73
See application file for complete search history.

(56) References Cited

U.S. PATENT DOCUMENTS

| | | |
|---|---|---|
| 2012/0004781 A1 | 1/2012 | Santos et al. |
| 2014/0232198 A1 | 8/2014 | Garcia et al. |
| 2017/0226988 A1 | 8/2017 | KJ R et al. |
| 2018/0363629 A1 | 12/2018 | KJ R et al. |
| 2019/0003456 A1 | 1/2019 | Garcia et al. |

OTHER PUBLICATIONS

PCT Notification of Transmittal of The international Search Report and The Written Opinion of The International Searching Authority, or The Declaration for Application PCT/DK2020/050030 dated Apr. 20, 2020.

\* cited by examiner

METHOD FOR CONTROLLING A POWER PLANT

FIELD OF THE INVENTION

The present invention relates to a method for controlling a power plant in environments where there might be grid frequency oscillation modes close to, for example, the natural frequency oscillation modes of the power production units of the power plant. The present invention also relates to a power plant controller configured for performing this method.

BACKGROUND OF THE INVENTION

It is a well-established practice for large grid frequency variations in power grids to be counteracted by either increasing or reducing the amount of active power provided to the power grids. More particularly, if the grid frequency increases the amount of provided active power should be reduced, and if the grid frequency decreases the amount of provided active power should be increased. Typically, a deadband is defined around a nominal grid frequency, and within this frequency deadband no active power regulation is performed.

Time varying grid frequency variations, i.e. grid frequency oscillations, may, in the frequency domain, comprise frequency modes that either coincide or come very close to undesired frequency modes of the power producing units of the power plant. Such undesired frequency modes may include the natural frequency modes of the power production units.

It might be associated with some risk to operate a power production unit, such as a wind turbine generator (WTG), with a grid frequency dependent response at or near one of its natural frequency modes as uncontrolled oscillations and/or vibrations may damage the power production unit.

There are prior art techniques that allow damping responses from power plants, but none of these prior art techniques aim at protecting the power production units of the power plant during active power response to grid frequency oscillation modes.

It may therefore be seen as an object of embodiments of the present invention to provide a method and a power plant controller having the ability to provide a safe grid frequency response in environments where there might be grid frequency oscillation modes close to, for example, the natural frequency oscillation modes of the power production units of the power plant.

DESCRIPTION OF THE INVENTION

The above-mentioned object is complied with by providing, in a first aspect, a method for operating a power plant comprising a plurality of power producing units, the power plant being operatively connected to an associated power grid having a nominal grid frequency, the method comprising the steps of a) determining grid frequency variations of the associated power grid, and b) providing, in response to the determined grid frequency variations, an active power set-point to each of the plurality of power producing units, said active power set-point causing each of the plurality of power producing units to produce active power in response to said active power set-point, said produced active power comprising, in a frequency domain, one or more active power frequency components being different from one or more undesired frequency modes.

Thus, according to the method of the present invention an active power response is provided in response to determined grid frequency variations. The active power response may involve an increase of active power or a decrease of active power. As it will be discussed in further details below grid frequency variations may occur around a nominal grid frequency of the power grid.

The method according to the present invention is advantageous via its ability to provide a safe grid frequency response in environments where there might be a degree of oscillation in grid frequency modes close to the natural oscillation frequency modes of the power production units. This includes conditions where the deadband has been reduced and/or where power production units respond to under-frequency events via for example curtailment.

The one or more undesired frequency modes may comprise one or more preselected frequency modes. The one or more preselected frequency modes may be determined beforehand either via calculations/simulations and/or via measurements. As an example the one or more preselected frequency modes comprise one or more known natural frequency modes of the power producing units, such as one or more tower natural frequency modes. The one or more tower natural frequency modes may comprise a fundamental tower frequency mode and/or higher order tower frequency modes. The one or more known natural frequency modes may also comprise other natural frequency modes than tower natural frequency modes, such as the 1P and 3P frequency modes, where the 1P frequency mode originates from the rotational speed of the wind turbine generator, and the 3P frequency mode relates to the rotor blade passing frequency, i.e. when the rotor blades passes the wind turbine tower.

Alternatively or in combination therewith the one or more undesired frequency modes may comprise one or more dynamic frequency modes being based on measured parameters, such as a measured side-to-side tower acceleration and/or a measured active power. The one or more dynamic frequency modes may be determined in real time. In order to determine the one or more dynamic frequency modes in real time appropriate feedback signals, such as the measured side-to-side tower acceleration and/or the measured active power, may be used. Other types of feedback signals may also be used.

In order to provide a safe grid frequency response in environments where there might be a risk of grid frequency oscillation modes close to the natural oscillation frequency modes of the power production units the one or more active power frequency components, in the frequency domain, are different form the one or more undesired frequency modes by a certain margin. This frequency margin may be in the range of pre-defined stability margin.

Each active power set-point may be specifically tailored to the power producing unit to which it is intended to be provided. This is advantageous in that the method thus facilitates that variations in the natural frequency modes of the power producing units, due to for example manufacturing tolerances, may be accounted for.

In principle, the power producing units may be any unit capable of producing power. Also, the power producing units may be of the same type, or even identical, or they may be of different types. Thus, the power producing units may be selected from the group consisting of: wind turbine generators, photovoltaic units and batteries.

In a second aspect, the present invention relates to a computer program product for performing the method according to the first aspect when said computer program product is executed on a microprocessor, such as executed on a microprocessor of a power plant controller.

In a third aspect, the present invention relates to a power plant controller for controlling a power plant comprising a plurality of power producing units, the power plant being operatively connected to an associated power grid having a nominal grid frequency, the power plant controller comprising
a) means for determining grid frequency variations of the associated power grid, and
b) a dispatcher arrangement for providing, in response to the determined grid frequency variations, an active power set-point to each of the plurality of power producing units, said active power set-point causing each of the plurality of power producing units to produce active power in response to said active power set-point, said produced active power comprising, in a frequency domain, one or more active power frequency components being different from one or more undesired frequency modes.

Thus, according to the third aspect a power plant controller for active power response is provided, wherein said active power response is provided in response to determined grid frequency variations. As addressed above the active power response may involve an increase of active power or a decrease of active power, and the grid frequency variations may occur around a nominal grid frequency of the power grid.

The power plant controller is advantageous for the same reasons as the method according to the first aspect, i.e. its ability to provide a safe grid frequency response in environments where there might be a degree of oscillation in grid frequency modes close to the natural oscillation frequency modes of the power production units. This includes conditions where the deadband has been reduced and/or where power production units respond to under-frequency events via for example curtailment.

As mentioned in relation to the first aspect the one or more undesired frequency modes may comprise one or more preselected frequency modes. The one or more preselected frequency modes may be determined beforehand either via calculations/simulations and/or via measurements. As an example the one or more preselected frequency modes comprise one or more known natural frequency modes of the power producing units, such as one or more tower natural frequency modes. The one or more tower natural frequency modes may comprise a fundamental tower frequency mode and/or higher order tower frequency modes. The one or more known natural frequency modes may also comprise other natural frequency modes than tower natural frequency modes such as the 1P and 3P frequency modes, where the 1P frequency mode originates from the rotational speed of the wind turbine generator, and the 3P frequency mode relates to the rotor blade passing frequency, i.e. when the rotor blades passes the wind turbine tower.

Alternatively or in combination therewith, as also mentioned above, the one or more undesired frequency modes may comprise one or more dynamic frequency modes being based on measured parameters, such as a measured side-to-side tower acceleration and/or a measured active power. The one or more dynamic frequency modes may be determined in real time. In order to determine the one or more dynamic frequency modes in real time appropriate feedback signals, such as the measured side-to-side tower acceleration and/or the measured active power, may be used. Other types of feedback signals may also be used.

In order to provide a safe grid frequency response in environments where there might be a risk of grid frequency oscillation modes close to the natural oscillation frequency modes of the power production units the one or more active power frequency components, in the frequency domain, are different form the one or more undesired frequency modes by a certain margin. This frequency margin may be in the range of pre-defined stability margin.

Each active power set-point may be specifically tailored to the power producing unit to which it is intended to be provided. This is advantageous in that the method thus facilitates that variations in the natural frequency modes of the power producing units, due to for example manufacturing tolerances, may be accounted for.

In principle, the power producing units may be any unit capable of producing power. Also, the power producing units may be of the same type, or even identical, or they may be of different types. Thus, the power producing units may be selected from the group consisting of: wind turbine generators, photovoltaic units and batteries.

In a fourth aspect, the present invention relates to a power plant comprising a power plant controller according to the third aspect of the present invention.

In general the various aspects of the invention may be combined and coupled in any way possible within the scope of the invention. These and other aspects, features and/or advantages of the invention will be apparent from and elucidated with reference to the embodiments described hereinafter.

BRIEF DESCRIPTION OF THE DRAWINGS

The present invention will now be explained in further details with reference to the accompanying figures, wherein.

Figure 1:
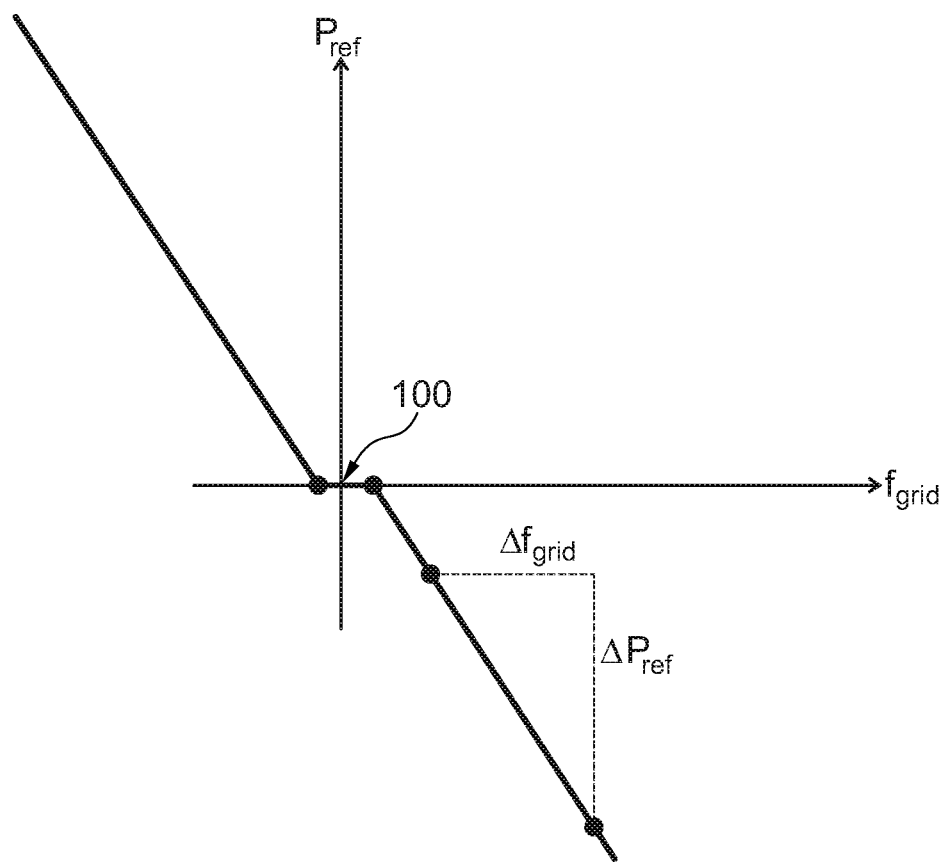
FIG. 1 illustrates a grid frequency response with a narrow deadband.

While the invention is susceptible to various modifications and alternative forms specific embodiments have been shown by way of examples in the drawings and will be described in details herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION OF THE INVENTION

In a general aspect the present invention relates to a method and a power plant controller for providing a safe grid frequency response in environments where there might be grid frequency oscillation modes close to, for example, the natural frequency oscillation modes of the power production units of the power plant. This includes conditions where the deadband has been reduced and/or where the power production units respond to under-frequency events via, for example, power curtailment.

Moreover, the present invention may facilitate safe operation in connection with small signal damping operation using active power using for example existing frequency response modules of power plants. Moreover, the present invention is not detrimental to the lifetime of the power producing units.

Generally, the present invention aims to decouple grid frequency oscillation modes caused by for example grid angle variations from a power production unit response during grid frequency response operation in order to allow for a more safe and controlled operation at the power production unit level. According to the present invention the output from an existing frequency control module in a power plant controller is distributed as active power set-points to a plurality of power production units in the power plant in a selective manner so that the active power set-points to the individual power producing units have their respective local frequency oscillation modes decoupled from the grid frequency oscillation modes at the power plant level.

As it will be disclosed in further details below the present invention may be implemented using the output of a power plant controller frequency control module and distribute separated active power set-points to the individual power production units based on frequency modes. According to the present invention the active power set-points including frequency oscillation modes close to undesired power production unit modes, e.g. natural tower frequency modes or other modes, will be distributed accordingly so that the individual active power set-points have a safety margin away from unwanted or undesired operation modes.

The present invention may also be implemented on the basis of real time feedback information from each power production unit. The feedback information may relate to current operational status and may thus provide information such as side-to-side tower accelerations, active power output of the power production units etc. The overall objective of providing real time feedback information is to provide an optimized dispatcher strategy in order to establish an optimized decision process when dispatching active power set-points to each of the power production units.

Referring now to FIG. 1 a typical grid frequency response function, i.e. $P_{ref}$ vs. $f_{grid}$, is depicted where $P_{ref}$ is the active power set-point and $f_{grid}$ is the grid frequency. The active power set-point, $P_{ref}$, typically relates to an entire power plant, but it may in principle also relate to a single power producing unit. As depicted in FIG. 1 a change or oscillation in the grid frequency of $\Delta f_{grid}$ will result in an active power set-point change of $\Delta P_{ref}$ in order to, on for example a power plant level, counteract the grid frequency change or oscillation, $\Delta f_{grid}$. A narrow deadband 100 exists around the nominal grid frequency which may be 50 Hz or 60 Hz.

Figure 2:
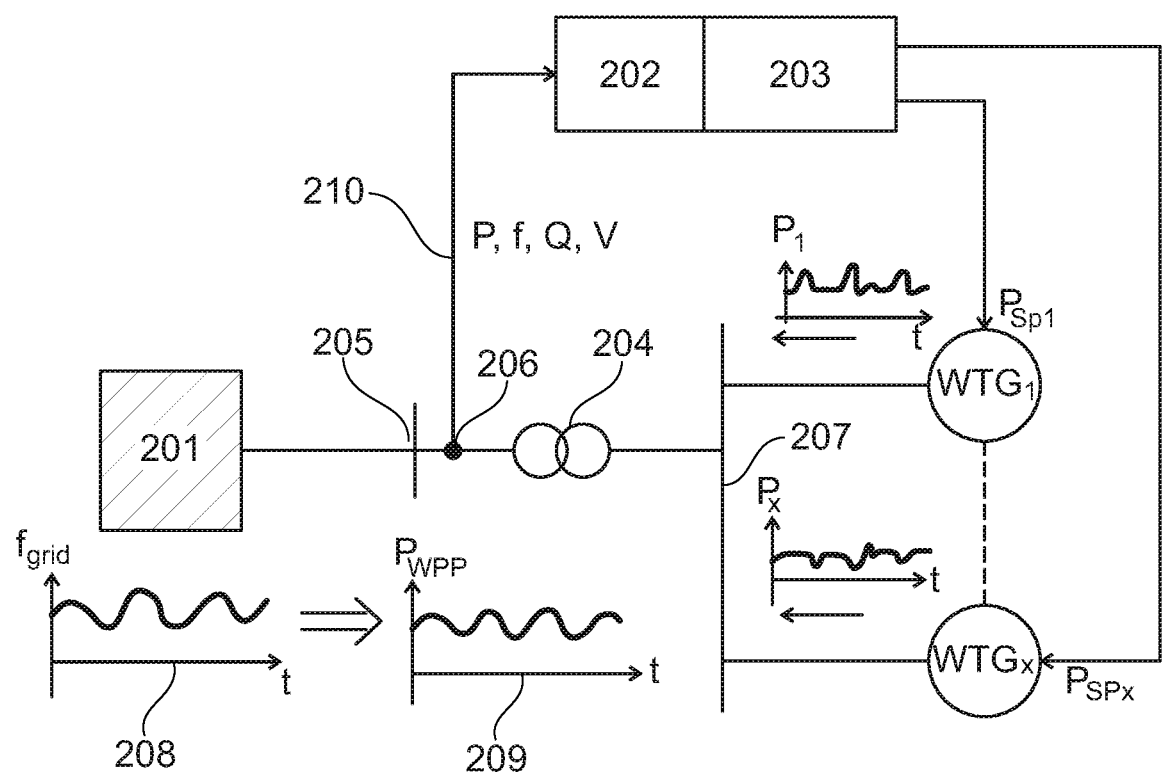
FIG. 2 shows a block diagram of a wind power plant.

Turning now to FIG. 2 a block diagram of a wind power plant connected to an associated power grid 201 is depicted. In general, and as illustrated in lower left portion of FIG. 2, detected grid frequency variations 208 cause an active power response 209 from the wind power plant, i.e. on a plant level, in order to counteract the detected grid frequency variations 208.

The wind power plant comprises a plurality of wind turbine generators ($WTG_1$-$WTG_x$) being connected to an internal power grid 207 which is connected to the associated power grid 201 via an optional transformer 204. A point of common coupling (PCC) 205 separates the internal power grid 207 from the associated power grid 201. Moreover, a point of measurement (PoM) 206 is provided between the PCC 205 and the transformer 204. Various measureable parameters like for example active power, reactive power, grid frequency, phase angle, grid voltage etc. may be measured at the PoM 206 and provided to the power plant controller (PPC) 202 via signal 210 for further processing. It should be noted that the various measureable parameters may also be provided by other plant or turbine controllers, synchrophasors etc.

In case of an active power response from the wind power plant due to detected grid frequency variations the dispatcher 203 provides individual active power set-points ($P_{SP1}$-$P_{SPx}$) to the plurality wind turbine generators ($WTG_1$-$WTG_x$) which, in response thereto, provides respective active power distributions ($P_1$-$P_x$) to the internal power grid 207 as depicted in FIG. 2.

According to the present invention the active power produced by wind turbine generators ($WTG_1$-$WTG_x$) in response to the dispatched active power set-points ($P_{SP1}$-$P_{SPx}$) comprises, in the frequency domain, frequency components that do not coincide with undesired frequency modes, such as natural frequency oscillation modes of the wind turbine generators. Thus, according to the present invention the power plant dispatcher 203 tailors each of the active power set-points so that none of the wind turbine generators ($WTG_1$-$WTG_x$) produce active power having, in the frequency domain, frequency components at or near undesired frequency modes. The undesired frequency modes are typically below 5 Hz. In the present context "at or near" should be taken to mean that there is a frequency margin or gap between the frequency components of the produced active power distributions ($P_1$-$P_x$) and the respective undesired frequency modes. The frequency margin or gap may be in the range of pre-defined stability margin.

This approach is advantageous in that the method according to the present invention provides a safe grid frequency response although the grid frequency oscillation modes may be close to for example the natural frequency oscillation modes of one or more of the wind turbine generators ($WTG_1$-$WTG_x$).

In general, the undesired frequency modes comprise one or more preselected frequency modes, i.e. fixed frequency modes, and/or one or more dynamic frequency modes, i.e. variable frequency modes, being based on measured parameters. The one or more preselected frequency modes may, as already mentioned, comprise one or more known natural frequency modes of the wind turbine generators ($WTG_1$-$WTG_x$), such as one or more tower natural frequency modes. The one or more dynamic frequency modes may be determined in real time and may comprise measurements of side-to-side tower accelerations and/or measurements of active power. The one or more dynamic frequency modes may however also be based on measurements of other parameters.

The wind turbine generators ($WTG_1$-$WTG_x$), or at least a number thereof, may be operated in a curtailed mode of operation in order to establish an available power reserve that may be used for grid frequency response during under frequency events—in particular in connection with narrow deadbands.

Although FIG. 2 shows a wind power plant it should be noted that the method according to the present invention is also applicable for other types of power plants comprising other types of power producing units, such as photovoltaic (PV) units, batteries as well as other types of power producing units.

Figure 3:
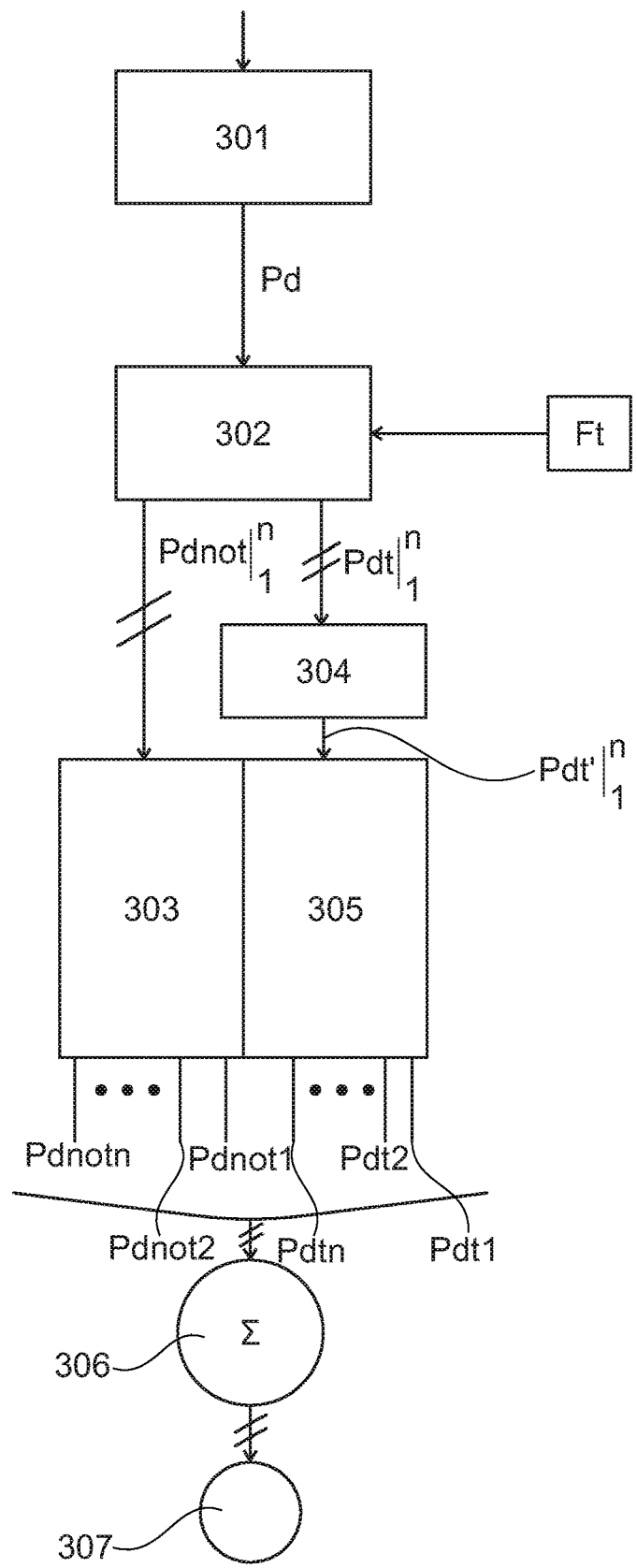
FIG. 3 shows a block diagram of a control scheme without real time feedback.
Figure 4:
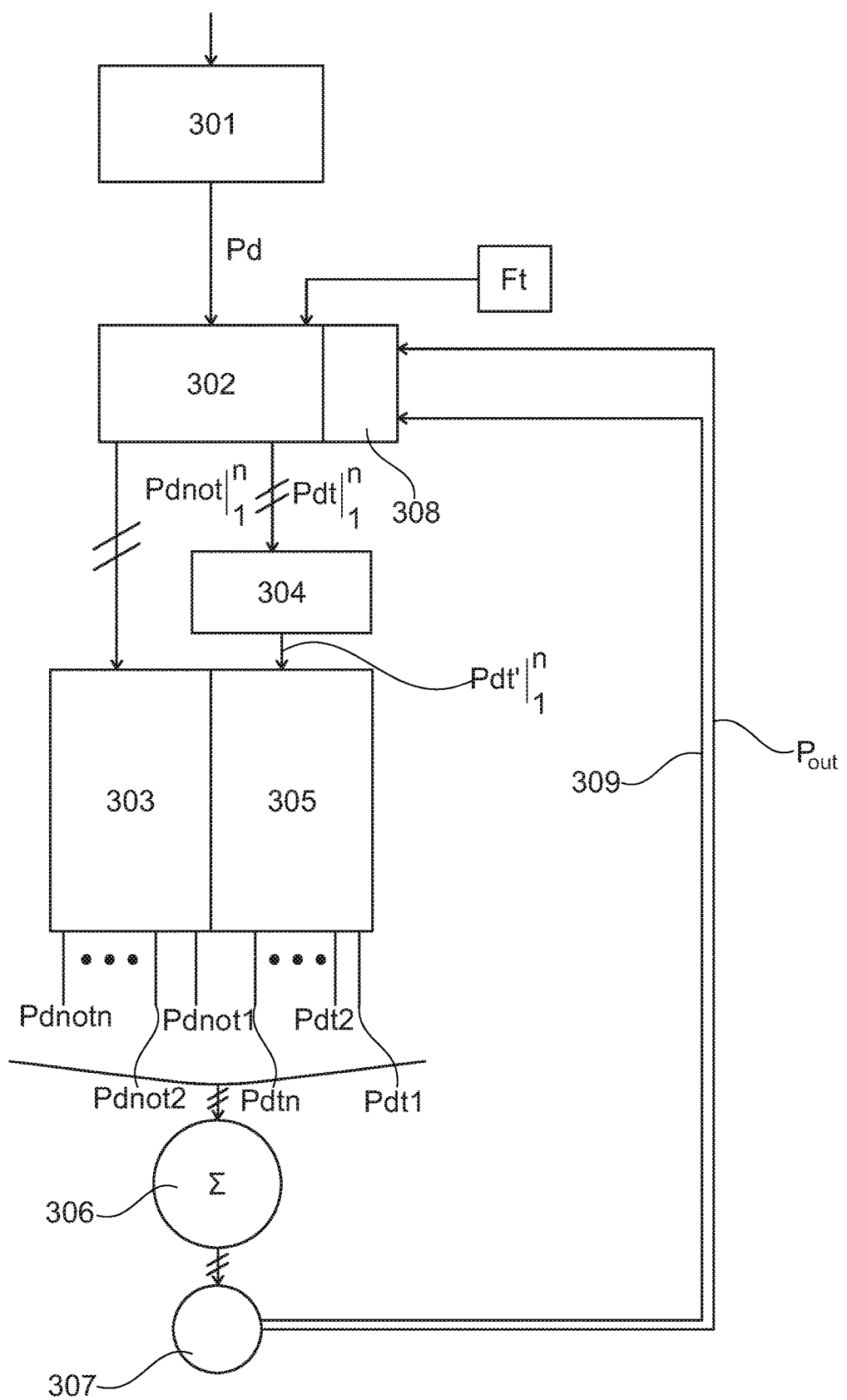
FIG. 4 shows a block diagram of a control scheme with real time feedback.
Figure 5:
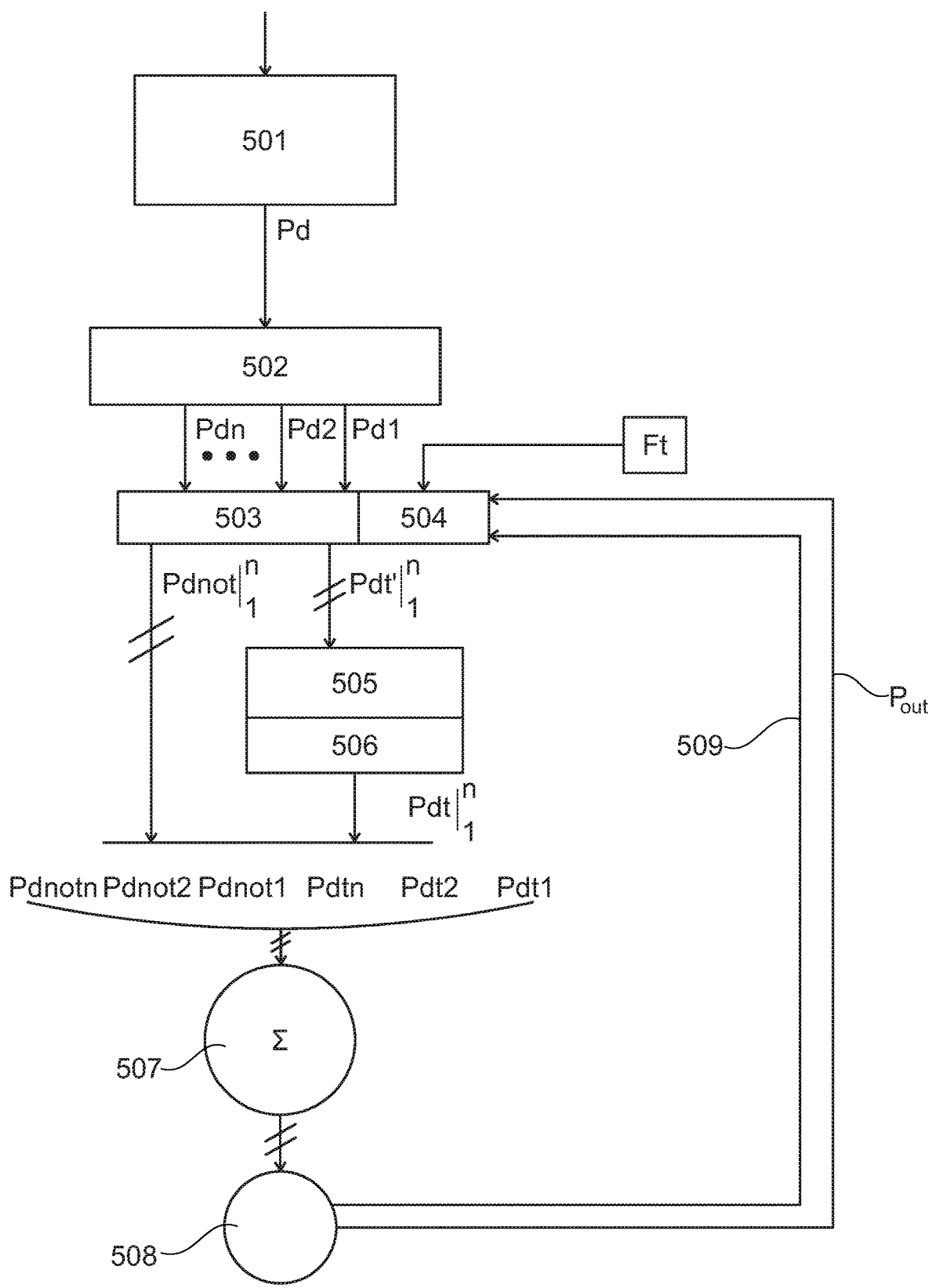
FIG. 5 shows a block diagram of a control scheme with pre-dispatcher and real time feedback.

Referring now to FIGS. 3-5 more detailed block diagrams are depicted. Starting from the top in FIG. 3 the controller 301 provides a signal, Pd, to the processor 302. The processor 302 is configured to analyze the signal, Pd, from the controller 301 and thus detect any frequency oscillation modes originating from the associated power grid (not shown). Potentially detected frequency oscillation modes are compared against any undesired (target) frequency modes, Ft. As previously discussed the undesired frequency modes may involve one or more preselected frequency modes, i.e. fixed frequency modes, and/or one or more dynamic frequency modes, i.e. variable frequency modes, being based on measured parameters.

In the processor 302 signal responses (for active power) to non-target frequency oscillation modes, Pdnot, are selected, separated from the response target frequency oscillation modes, Pdt, and sent directly to a dispatcher 303. Signal responses to the target oscillation modes, Pdt, are sent to a shifter 304 where they are modified as disclosed in the following. The target signal responses to the target oscillation modes, Pdt, are modified in such a way that any single power producing unit response provides a response that is, in the frequency domain, shifted away from target frequency oscillation modes, whereas the overall/total summated response of the power producing units will match the required frequency response and will be in counter phase with the frequency oscillation modes originating from the associated power grid. In the shifter 304 the signal responses may be modified in various ways including, but not limited to, frequency shifting, phase shifting, partial cycle slicing, delay, etc.

The response signals to the non-target oscillation modes, Pdnot, and the shifted response signals to the target oscillation modes, Pdt', are provided as inputs to the power plant dispatchers 303, 305 whereafter the individual response signals, Pdnot1-n, Pdt1-n, are combined in combiner 306 and sent to each of the respective power producing units 307.

In another embodiment, cf. FIG. 4, the processor 302 may furthermore be configured to analyze the signal, Pd, from the controller 301 by taking into consideration measured real time information relating to the overall power plant active power output and/or individual active power output, Pout, from the power producing units. Such real time information is provided to the processor 302 via a pre-processor 308. Other control feedback signals 309, such as sensor signals from for example accelerometers, synchrophasors, etc. may also be provided to the pre-processor 308.

In yet another embodiment, cf. FIG. 5, a pre-dispatcher 502 is inserted between the controller 501 and the processor 503/pre-processor 504. The functioning of the shifter 505, dispatcher 506 and the combiner 507 are similar as disclosed above. Thus, the processor 503 is configured to take into consideration measured real time information relating to the overall power plant active power output and/or individual active power output, Pout, from the power producing units 508. Such measured real time information is provided via a pre-processor 504. Again, other control feedback signals 509, such as sensor signals from for example accelerometers, synchrophasors, etc. may also be provided to the pre-processor 504. The pre-dispatcher 502 is advantageous in that it facilitates that signal detection can be performed on individual power producing unit set-points after they have been allocated which allows flexibility in cases where it has been decided not to perform any action if the required active power response for a given mode per WTG is below a certain threshold.

The invention claimed is:

1. A method for operating a power plant comprising a plurality of power producing units, the power plant being operatively connected to an associated power grid having a nominal grid frequency, the method comprising:
  a) determining grid frequency variations of the associated power grid, and
  b) providing, in response to the determined grid frequency variations, an active power set-point to each of the plurality of power producing units, said active power set-point causing each of the plurality of power producing units to produce active power in response to said active power set-point, said produced active power comprising, in a frequency domain, one or more active power frequency components being different from one or more undesired frequency modes, wherein the one or more undesired frequency modes comprise one or more preselected frequency modes.

2. The method of claim 1, wherein the one or more preselected frequency modes comprise one or more known natural frequency modes of the power producing units, wherein the one or more known natural frequency modes comprise one or more tower natural frequency modes.

3. The method of claim 1, wherein the one or more undesired frequency modes comprise one or more dynamic frequency modes being based on measured parameters, wherein the measured parameters comprise at least one of (i) a measured side-to-side tower acceleration or (ii) a measured active power.

4. The method of claim 3, wherein the one or more dynamic frequency modes are determined in real time.

5. The method of claim 1, wherein the one or more active power frequency components, in the frequency domain, are different from the one or more undesired frequency modes by a certain margin.

6. The method of claim 1, wherein each active power set-point is specifically tailored to the power producing unit to which it is intended to be provided.

7. The method of claim 1, wherein the power producing units are selected from the group consisting of: wind turbine generators, photovoltaic units and batteries.

8. A power plant controller for controlling a power plant comprising a plurality of power producing units, the power plant being operatively connected to an associated power grid having a nominal grid frequency, the power plant controller comprising:
  a) means for determining grid frequency variations of the associated power grid, and
  b) a dispatcher arrangement for providing, in response to the determined grid frequency variations, an active power set-point to each of the plurality of power producing units, said active power set-point causing each of the plurality of power producing units to produce active power in response to said active power set-point, said produced active power comprising, in a frequency domain, one or more active power frequency components being different from one or more undesired frequency modes, wherein the one or more undesired frequency modes comprise one or more preselected frequency modes.

9. The power plant controller according to claim 8, wherein the one or more preselected frequency modes comprise one or more known natural frequency modes of the power producing units, wherein the one or more known natural frequency modes comprise one or more tower natural frequency modes.

10. The power plant controller according to claim 8, wherein the one or more undesired frequency modes comprise one or more dynamic frequency modes being based on measured parameters, wherein the measured parameters comprise at least one of (i) a measured side-to-side tower acceleration or (ii) a measured active power.

11. The power plant controller according to claim 10, wherein the one or more dynamic frequency modes are determined in real time.

12. The power plant controller according to claim 8, wherein the one or more active power frequency components, in the frequency domain, are different from the one or more undesired frequency modes by a certain margin.

13. The power plant controller according to claim 8, wherein each active power set-point is specifically tailored to the power producing unit to which it is intended to be provided.

14. The power plant controller according to claim 8, wherein the power producing units are selected from the group consisting of: wind turbine generators, photovoltaic units and batteries.

15. A non-transitory computer program product for performing an operation when said non-transitory computer program product is executed on one or more processors, the operation, comprising:
  determining grid frequency variations of a power grid having a nominal frequency and associated with a power plant comprising a plurality of power producing units, and
  providing, in response to the determined grid frequency variations, an active power set-point to each of the plurality of power producing units, said active power set-point causing each of the plurality of power producing units to produce active power in response to said active power set-point, said produced active power comprising, in a frequency domain, one or more active power frequency components being different from one or more undesired frequency modes, wherein the one or more undesired frequency modes comprise one or more preselected frequency modes.

16. A power plant, comprising:
a plurality of power producing units associated with a power grid having a nominal frequency; the plurality of power producing units selected from one or more of: wind turbine generators, photovoltaic units and batteries; and
a controller communicatively coupled to the plurality of power producing units and configured to perform an operation, comprising:
determining grid frequency variations of the power grid, and
providing, in response to the determined grid frequency variations, an active power set-point to each of the plurality of power producing units, said active power set-point causing each of the plurality of power producing units to produce active power in response to said active power set-point, said produced active power comprising, in a frequency domain, one or more active power frequency components being different from one or more undesired frequency modes, wherein the one or more undesired frequency modes comprise one or more preselected frequency modes.

* * * * *